Sept. 5, 1944.  F. BURCHELL  2,357,310
APPARATUS FOR MAKING DESIGNS
Original Filed March 29, 1940   3 Sheets-Sheet 2

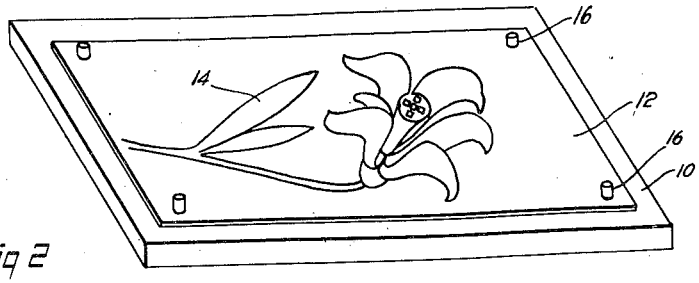
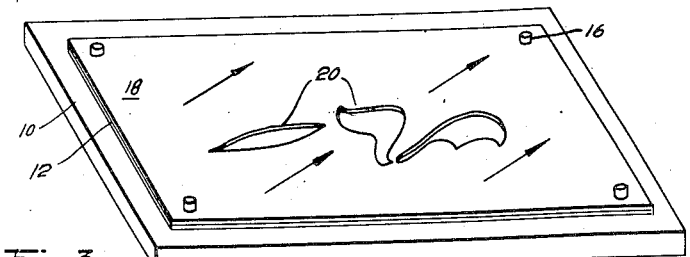
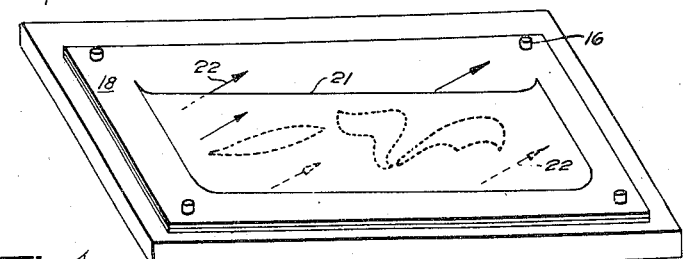
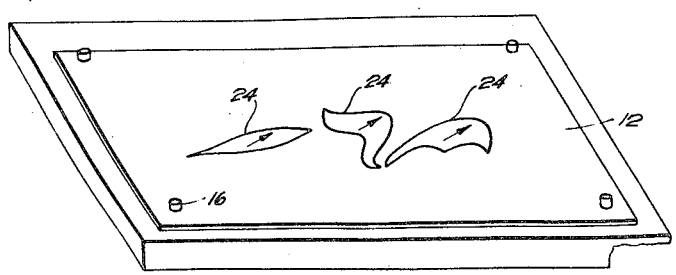

F FORD BURCHELL
INVENTOR.

BY Brown & Jones,
ATTORNEYS.

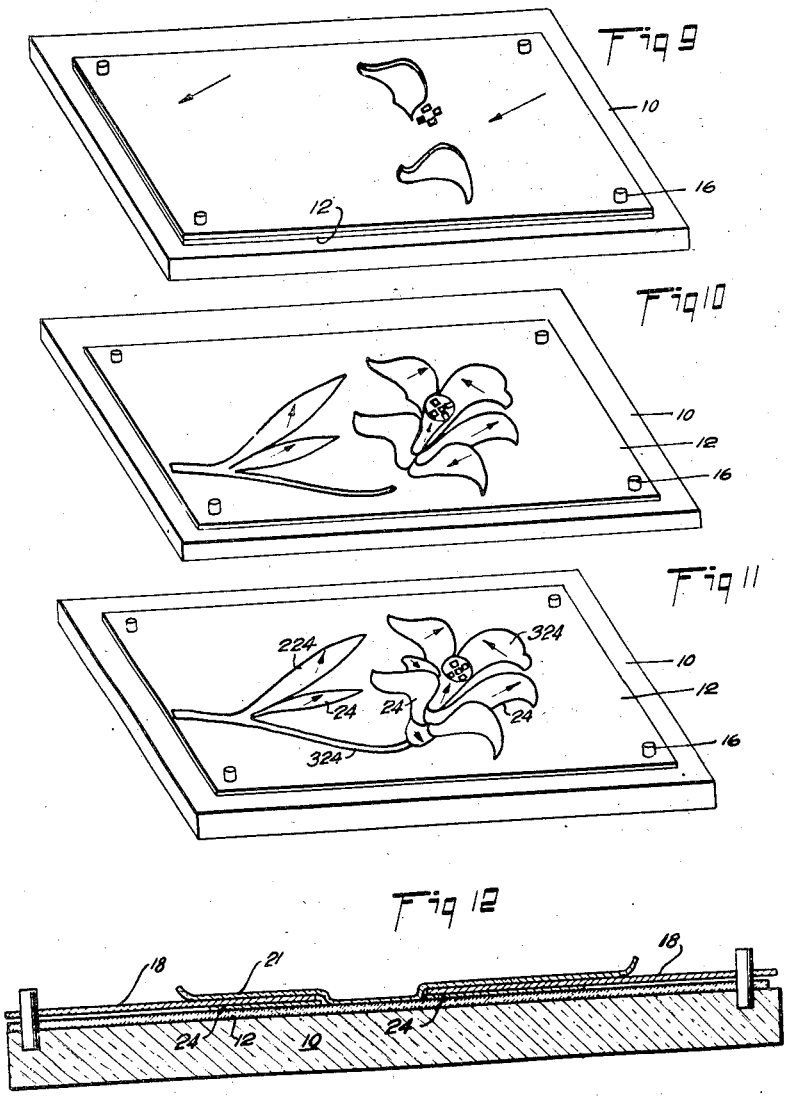

Patented Sept. 5, 1944

2,357,310

UNITED STATES PATENT OFFICE 2,357,310

APPARATUS FOR MAKING DESIGNS

Fford Burchell, Port Chester, N. Y., assignor to Burchell-Holloway Corporation, New York, N. Y., a corporation of New York Original application March 29, 1940, Serial No. 326,549. Divided and this application April 28, 1942, Serial No. 440,769

8 Claims. (Cl. 41—34)

This invention relates to apparatus for use in making designs and more specifically to apparatus for use in building laminated designs.

This is a divisional application of my application Serial No. 326,549, filed March 29, 1940, now Patent No. 2,293,696, issued August 25, 1942.

In general, it is an object of the invention to provide a device of the character described, which will efficiently accomplish the results for which it is intended, which is simple and economical of construction, which can be expeditiously, conveniently and safely manipulated, and which can be readily manufactured and assembled.

Another object of the invention is to provide apparatus for building up a laminated design and for the registering of the component parts of a design, whereby the contours of any one lamination or portion thereof are brought to the attention of the worker, and for doing so while permitting the worker to fit one lamination into intricacies and/or inaccuracies of design in another lamination, and for accomplishing these ends by optical and/or mechanical means; to provide such apparatus whereby the excess material in any lamination is quickly removed as a whole and/or without danger of simultaneously removing a portion of another lamination; to provide such apparatus with which the optical directions of the several laminations may be quickly and respectively oriented as desired; and to provide apparatus for duplicating with great multiplicity, a design and especially with discrete components originally non-fluid.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Fig. 1 is a perspective view of a desired sketched design on a sheet carried by a support;

Fig. 2 is a perspective view of the supported sheet of Fig. 1 with no lamination thereon and covered by a stencil;

Fig. 3 is a view similar to Fig. 2 with a lamination on top of the stencil;

Fig. 4 is a view with the stencil removed, the parts of the lamination remaining which were attached to the sheet through the stencil openings, the sketched design not being shown for purposes of clarity;

Fig. 9 shows the fourth stencil on the sheet;

Fig. 10 is a view similar to Figs. 6 and 8 but with four sets of design elements;

Fig. 11 shows the final design after further design elements have been added by similar steps; and Fig. 12 is a cross-section of the device shown in Fig. 5.

Figure 5:
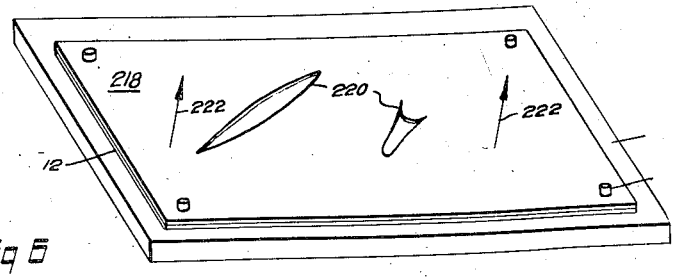
Fig. 5 is a similar view of a second stencil imposed on the original sheet and the first set of laminar design elements.

The product contemplated by the present invention comprises a mosaic-like design superposed on a foundation sheet and having design elements which are non-fluid before they are applied and which may or may not be alike optically. The particular final product described below appears in non-polarized transmitted light to be a sheet having varying thicknesses, or a uniform thickness, which close observation may show to have a design. The design may or may not be emphasized by shading applied to the sheet. The one or more layers which give the design are of doubly refracting material. When the product is viewed through a plane-polarizing analyzer in light which is polarized before passing through the product, the latter appears colored, the colors differing with its thickness and for any one thickness. If the plane of polarization of the incident light is rotated through 180 degrees, the color of any one thickness changes from a given color to its own complementary color and back to the original color. Simultaneously, the different color of another thickness changes to its complement and back. Therefore, at any one time, two parts of the design having the same thickness differ in color if the doubly refracting axes of one part are at an angle with those of the other part. The product, so illuminated with light of constantly changing polarization, gives a constantly changing color pattern. The results are quite spectacular and strange optical illusions of motion are obtained. The undersigned has made them by sticking a doubly refracting lamination to a foundation sheet, the optic axes being in a predetermined direction. Portions of the lamination were removed to leave a part of a design. Some of the removed portions were necessarily large and difficult to disengage. In order to attach other portions of the first thickness above the foundation, e. g., with optical axes in different directions, a second lamination was laid down on the foundation and the remaining portions of the first lamination. The undesired parts of the second lamination were then removed with the added trouble that sometimes the removal of a portion of the second lamination also removed an underlying part of the first lamination.

The present invention contemplates a method whereby the above difficulties, as well as others, are obviated and the process improved in other respects, and whereby such a design may be constructed of non-fluid components whether doubly refracting or not.

In the drawings, 10 denotes a workman's table or base on which is placed the translucent foundation sheet 12 which may be clear or frosted. If desired the table 10 may be translucent. A cellulose acetate sheet may be used. On the sheet there may or may not be printed, or otherwise applied, the design 14, and/or shading therefor, which is to be built up in laminations. Any suitable means may be availed of to position the sheet. There may be posts 16 in the base over which holes in the sheet fit. Design 14 may be applied to table 10.

A stencil 18 is laid on sheet 12 and similarly positioned by posts 16. It has certain openings 20 which correspond with certain parts of the design. A lamination 21 of doubly refracting material such as "Cellophane" is adhesively secured to the top of the stencil and through the openings therein to the top of sheet 12. The optical directions of lamination 21 are known and they are oriented in a predetermined direction by means of one or more indicia 22, printed or impressed on or otherwise associated with the stencil. Adhesive may have been spread over the underside of the lamination before superposition or over the sheet 12 or the portion thereof visible through the opening in the stencil. The lamination is then scored, fractured or broken along the periphery of the openings 20. The stencil, with parts of the lamination attached to it, is lifted off, leaving (see Fig. 4) the foundation 12 with design elements 24 from the lamination secured to it. The arrow shown on any one of those elements merely indicates, for purposes of this description, the direction of the optic axis of the material of those elements. The stencil may be of paper and, having been used, may be thrown away.

The successive applications of laminations for the purpose of depositing various elements of the design in the same or different planes may be carried out on the same base 10 or preferably on a separate base for each application. In the latter case the foundation sheet 12 with attached elements is moved from base to base as the method proceeds and each base may have applied to it in some convenient fashion only so much of the complete design as is to be applied to the foundation sheet 12 while it is on that respective base. Even those peripheries of the new part of the design which are in registry with already laid down parts of the design need not be shown on that base or table 10 above which the new part or parts of the design are attached to the foundation sheet 12.

Figure 6:
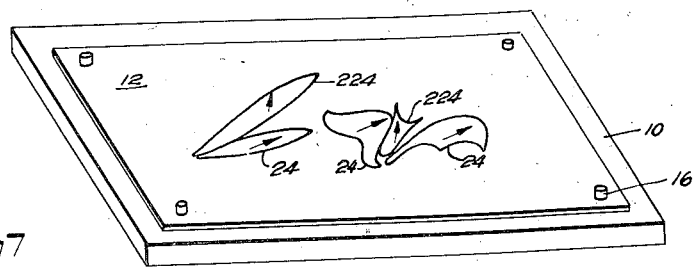
Fig. 6 is a similar view, with the second stencil removed, after an operation similar to that shown in Fig. 3, of the supported sheet and the two sets of laminar design elements attached thereto.

Similarly, a second stencil, 218, is next laid down (see Fig. 5). It has openings 220 which correspond to other portions of the design 16. A second lamination is placed on the second stencil and oriented optically by means of indicia 222 on stencil 218. It is fractured along the peripheries of openings 220. Stencil 218 is removed, leaving design elements 224 on foundation 12 along with the previously applied design element 24 (see Fig. 6). The two sets have their respective optic axes at an angle with each other. The openings 220 may be slightly larger than the corresponding portions of the design. This facilitates the cutting of overlaid laminations, particularly where one of the portions of the design is juxtaposed to design element 24 previously applied, as in that case the edge of the latter is visible through opening 220 and the operator may follow it as a guide so that a design element 224 may fit exactly along any mistake or irregularity in the adjacent element 24. The underlying element 24 may be made more evident through opening 220 by illuminating it from below with polarized or non-polarized light.

Figure 7:
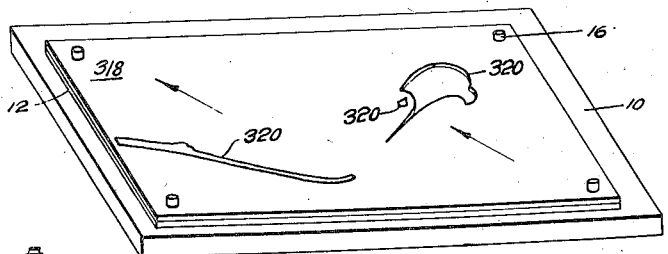
Fig. 7 is a similar view of another operation similar to that shown in Figs. 2 and 5.
Figure 8:
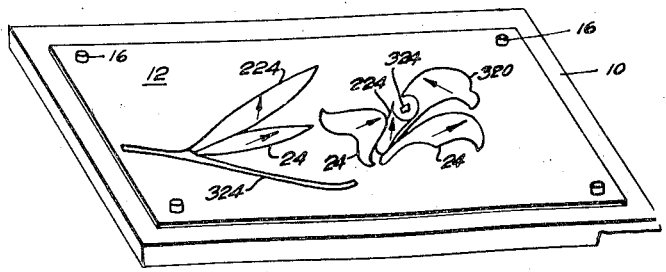
Fig. 8 is a view similar to Fig. 6 but at a time after Fig. 7 when there are three sets of laminar design elements attached to the sheet.

The steps of the last paragraph are repeated with stencil 318 having openings 320 and further elements 324 are applied thereby (see Figs. 7 and 8).

Figs. 9 and 10 show two further similar steps. There may be any number of such pairs of steps. The final product is shown in Fig. 11.

In order to obtain certain color combinations, certain of the design elements may be intentionally overlaid. The stencils may be of metal and have sharp edges at their openings.

When the elements of the design are complicated, or for other reasons, a single operator may carry out only one pair of steps on successive products, other operators carrying out other pairs of steps on other tables 10.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What I claim as new and desire to secure by Letters Patent is:

1. The combination comprising a plurality of stencils each having an opening, each of said openings being part of a mutual design, certain of said stencils having indicia associated therewith indicating a respective direction.

2. The combination comprising a plurality of stencils each having an opening, each of said openings being part of a mutual design, and means for holding said stencils in a predetermined position whereby said mutual design may be built up through operating in conjunction with the said openings.

3. The combination comprising a translucent base, means for directing polarized light through said base, a foundation sheet, a plurality of stencils adapted to be positioned successively against said sheet, and a plurality of doubly refracting sheets adapted to be positioned respectively against said stencils and simultaneously against said foundation sheet.

4. The combination comprising a foundation sheet, a plurality of stencils adapted to be positioned successively against said sheet and a plurality of doubly refracting sheets adapted to be positioned respectively against said stencils and simultaneously against said foundation sheet.

5. The combination comprising a foundation sheet, a plurality of stencils each having an opening therein, said openings each being part of a mutual design and said stencils being adapted to be positioned successively against said sheet, and a plurality of doubly refracting sheets respectively and adhesively attached to said stencils and over the openings therein and adapted to be adhesively attached to said foundation sheet through said openings.

6. The combination comprising a foundation sheet, a plurality of stencils each having an opening therein, said openings each being part of a mutual design and said stencils being adapted to be positioned successively against said sheet, and a plurality of doubly refracting sheets respectively and adhesively attached to said stencils with respectively varying orientations of their optic axes and over the openings therein and adapted to be adhesively attached to said foundation sheet through said openings.

7. The combination comprising a foundation sheet, a plurality of stencils each having an opening therein, said openings each being part of a mutual design and said stencils being adapted to be positioned successively against said sheet, and a plurality of other sheets respectively and adhesively attached to said stencils and over the openings therein and adapted to be adhesively attached to said foundation sheet through said openings and adhesive on those surface areas of said other sheets which areas are on the side of said other sheets facing said stencils and which areas are in registry with the openings in said stencils whereby said adhesion to said foundation sheet is accomplished.

8. The combination comprising a plurality of stencils to be used with birefringent material, each stencil having an opening, each of said openings being part of a mutual design, certain of said stencils having indicia associated therewith to indicate an optical direction of birefringent material to be used therewith and means for holding said stencils in a predetermined position whereby said design may be built up through operating in conjunction with said openings and said indicia.

FFORD BURCHELL.